United States Patent
Nay et al.

(10) Patent No.: US 6,633,332 B1
(45) Date of Patent: Oct. 14, 2003

(54) DIGITAL CAMERA SYSTEM AND METHOD CAPABLE OF PERFORMING DOCUMENT SCANS

(75) Inventors: Kevin W Nay, Fort Collins, CO (US); Michael Andrews, Fort Collins, CO (US); Richard L Kochis, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/311,517

(22) Filed: May 13, 1999

(51) Int. Cl.[7] ................................................. H04N 5/225
(52) U.S. Cl. ............................ 348/220.1; 348/207.99; 348/239
(58) Field of Search ......................... 348/207.99, 222.1, 348/231.99, 333.01, 333.02, 333.05, 333.12, 335, 373, 374, 375, 376, 220.1, 239; 358/372–374, 494, 497; 382/312, 313; 250/208.1; 710/5; 428/690

(56) References Cited

U.S. PATENT DOCUMENTS

| | | | |
|---|---|---|---|
| 5,499,113 A | 3/1996 | Tsuboi et al. | |
| 5,581,783 A * | 12/1996 | Ohashi | ........................... 710/5 |
| 5,686,720 A | 11/1997 | Tullis | |
| 5,703,353 A | 12/1997 | Blalock et al. | |
| 5,708,515 A | 1/1998 | Nishiura | |
| 5,729,008 A | 3/1998 | Blalock et al. | |
| 5,769,384 A | 6/1998 | Baumgartner et al. | |
| 5,825,044 A | 10/1998 | Allen et al. | |
| 6,048,630 A * | 4/2000 | Burrows et al. | ............. 428/690 |
| 6,111,604 A * | 8/2000 | Hashimoto et al. | ...... 348/220.1 |
| 6,226,422 B1 | 5/2001 | Oliver | |
| 6,229,565 B1 * | 5/2001 | Bobry | ................... 348/207.99 |
| 6,303,921 B1 * | 10/2001 | Hastings et al. | ......... 250/208.1 |

* cited by examiner

Primary Examiner—Tuan Ho

(57) ABSTRACT

A digital camera system is provided for capturing pictures of scenery or scanning the text of a document. A lens of the digital camera system receives light from a scene, and a conversion device defines a first set of digital data based on this light. A scanning mechanism included within the digital camera system scans a document as the system is passed over the surface of the document and produces a second set of data that defines an image of the document. An audio signal interface included within the digital camera system receives an audio message and defines a third set of digital data based on the audio message. A system controller stores the first, second, and third sets of data into a storage device. If desired, the first and second sets of data may be merged together to define a combined image depicting at least a portion of the scene defined by the first set of digital data and depicting at least a portion of the document defined by the second set of digital data.

12 Claims, 8 Drawing Sheets

DIGITAL CAMERA SYSTEM AND METHOD CAPABLE OF PERFORMING DOCUMENT SCANS

BACKGROUND OF THE INVENTION

1. Field of the Invention

The present invention generally relates to digital cameras and, in particular, to a digital camera system with a scanning mechanism integrated therein.

2. Related Art

A digital camera is a well known device that includes a charge-coupled device (CCD) for converting an image received by the digital camera into digital data. This digital data is usually stored into memory and later downloaded so that a picture of the image defined by the digital data can be developed. The digital data can also be transmitted to a display screen that renders the image defined by the digital data. In fact, most digital cameras include a liquid crystal display (LCD) that renders the images defined by the digital data, when desired.

However, a problem with most digital cameras is that they are not readily suited for creating a readable image of a textual document. Indeed, the resolution of most digital cameras is not sufficient to produce an image of a textual document such that the text of the document is readable from the image. Although the resolution of a digital camera's lens can be increased, the size and cost of the camera's lens usually increases with resolution. Therefore, a lens having sufficient resolution for defining the text of a textual document in a readable form is usually expensive and relatively large. In fact, the large size of such a lens is likely to deter many users from utilizing the lens, especially in applications where the digital camera is frequently transported. Therefore, many users are likely to select a digital camera having a lens that is insufficient for imaging the text of a textual document in a readable form.

Thus, a heretofore unaddressed need exists in the industry for providing a digital camera system capable of imaging the text of a textual document in a readable form. To facilitate transportation, it is desirable for the size of the digital camera system to be minimized.

SUMMARY OF THE INVENTION

The present invention overcomes the inadequacies and deficiencies of the prior art as discussed hereinbefore. Generally described, the present invention provides a digital camera system capable of scanning the text of a document to define data that produces a readable image of the text of the document when the data is rendered to a user.

The present invention utilizes a lens, a conversion device, a scanning mechanism, a storage device, and a system controller. The lens receives light from a scene, and the conversion device defines a first set of digital data based on this light. The scanning mechanism scans a document as the system is passed over the surface of the document and produces a second set of data that defines an image of the document. The system controller stores the first and second sets of data into the storage device.

In accordance with another feature of the present invention, the scanning mechanism includes an imaging sensor, a navigational sensor, and a processing device. The imaging sensor and navigational sensors receive light from the document as the system is passed over the surface of the document and produce electrical signals based on this light. The processing device receives the electrical signals and tracks a path of the system across the document based on the electrical signals received from the navigational sensor. The processing device also defines the second set of digital data based on the electrical signals received from the imaging sensor.

In accordance with another feature of the present invention, the system controller merges the first and second sets of digital data into a third set of digital data. Therefore, images corresponding with the first and second sets of digital data can be defined by the third set of digital data and can be simultaneously displayed to the user as a single image.

In accordance with another feature of the present invention, an audio signal interface may be used to receive an audio message and to define a third set of digital data based on the audio message. The system controller then stores the third set of data into the storage device. If desired, the system controller may correlate any of the data files stored in the storage device based on inputs from a user.

The present invention can also be viewed as providing a method for use with a digital camera. Briefly described, the method can be broadly conceptualized by the following steps: receiving light through a lens of a digital camera; defining a first set of digital data based on the light; scanning a document via an imaging sensor of the digital camera; defining a second set of digital data based on the scanning step; and storing the first and second sets of digital data into a storage device of the digital camera.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
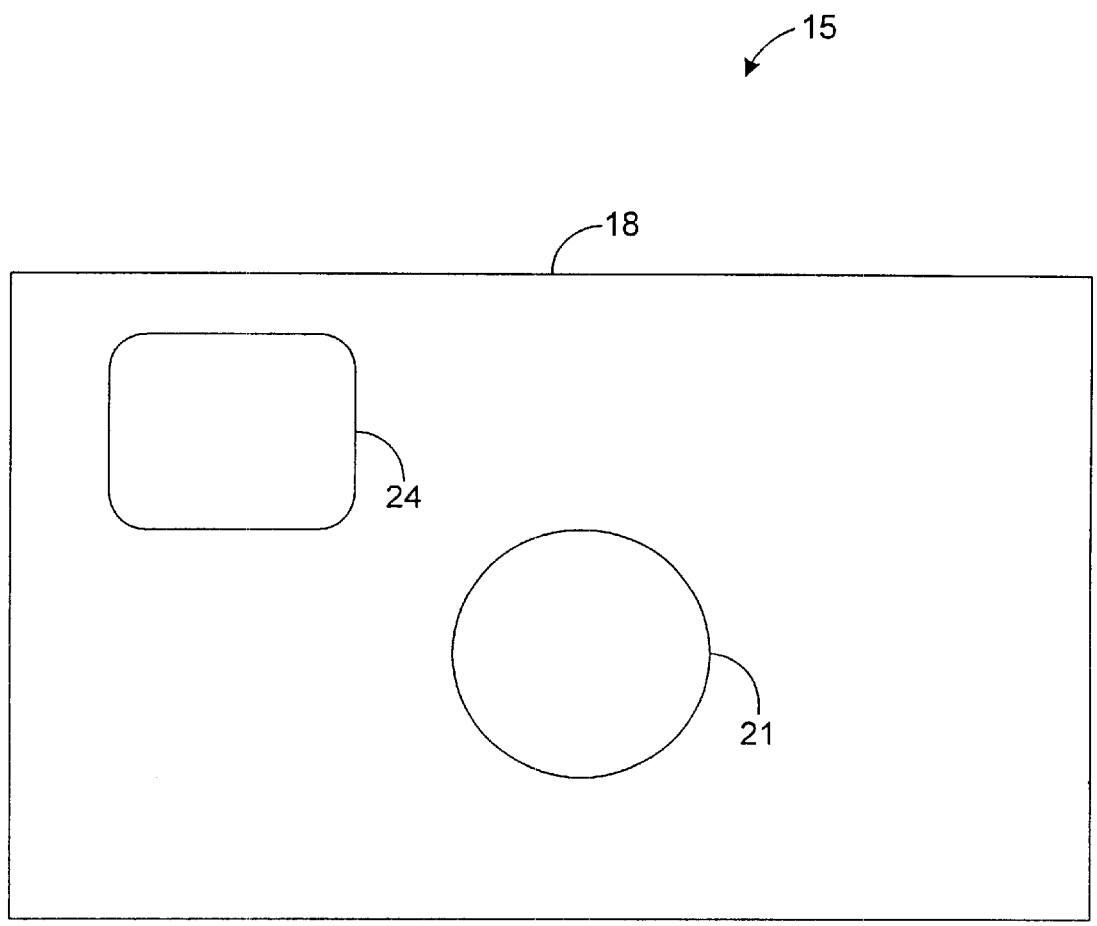
FIG. 1 is a schematic diagram illustrating a front view of a conventional digital camera system.

FIG. 1 depicts a conventional digital camera system 15. The system 15 includes a housing unit 18 that houses and protects internal components of the system 15. The system 15 also includes a lens 21 and an optical viewfinder 24. The lens 21 forms an image from light received by the lens 21, and the optical viewfinder 24 is used to correctly position the system 15 before taking a picture. The optical viewfinder 24 may simply be a hollow region passing through the housing unit 18 that enables a user view a scene through the system 15. In more complex designs, the optical viewfinder 24 may provide "through-the-lens" viewfinder capability where the image formed by the lens 21 is visible through the optical viewfinder 24. The design of the optical viewfinder 24 is not an important feature of the present invention.

Figure 2:
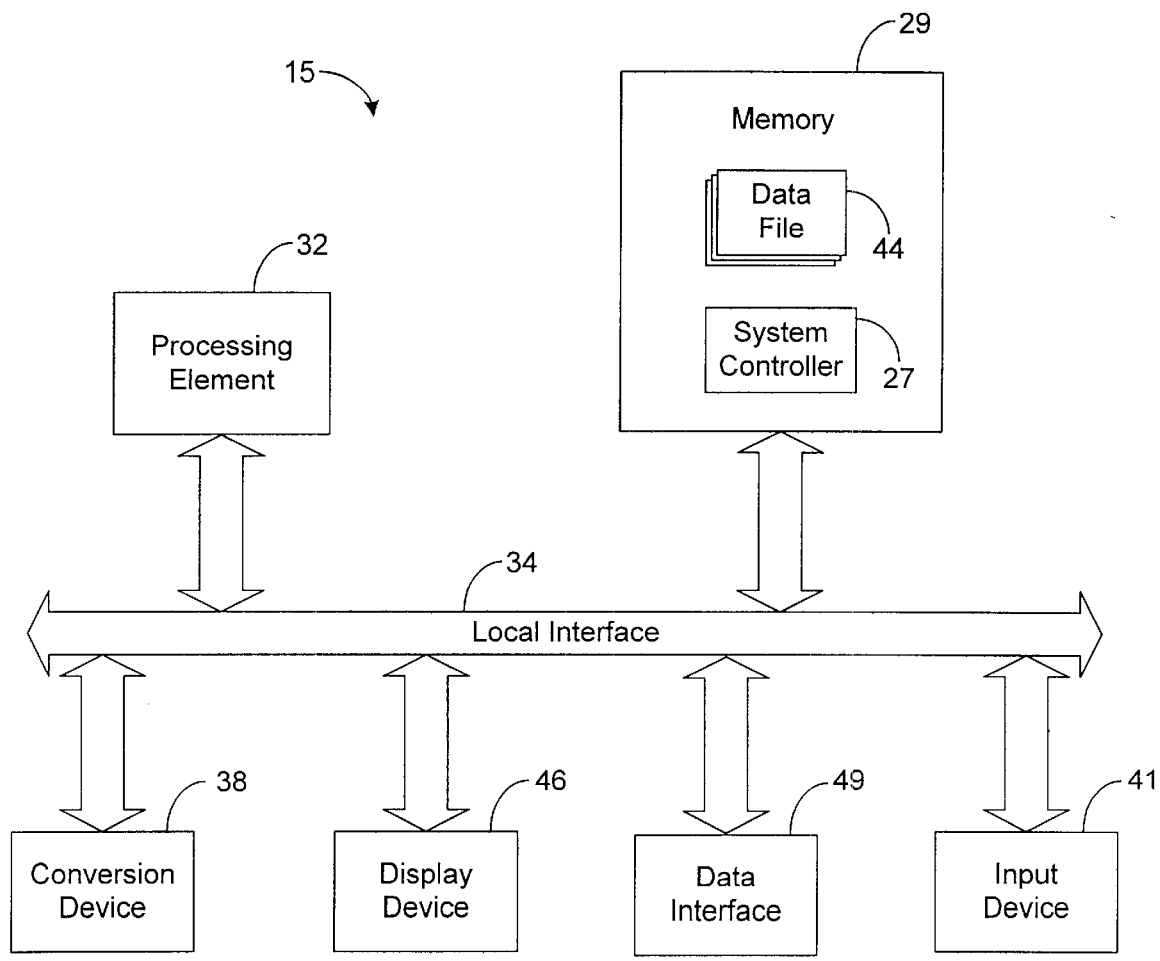
FIG. 2 is a block diagram illustrating the digital camera system of FIG. 1.

Referring to FIG. 2, the system 15 usually includes a system controller 27 implemented in software and stored in memory 29. The system controller 27 is designed to control the operation of the system 15. One or more conventional processing elements 32, such as a digital signal processor (DSP), communicate to and drive the system controller 27 and the other elements within the system 15 via a local interface 34, which can include one or more buses.

A conversion device 38, such as a charge-coupled device (CCD), for example, produces digital data defining the image formed by the lens 21, through techniques well known in the art. Furthermore, an input device 41, which may include buttons and/or switches, for example, provides inputs from a user of the system 15. Based on the inputs provided by the input device 41, the system controller 27 determines when the digital data produced by conversion device 38 should be stored in memory 29 (i.e., when a picture should be taken). When the system controller 27 determines that a picture should be taken, the system controller 27 stores the digital data currently produced by the conversion device 38 into memory 29 as a data file 44. Therefore, each data file 44 includes data that defines an image formed by the lens 21 at a time when the input device 41 indicates that a picture should be taken.

The system 15 also typically includes a display device 46, such as a liquid crystal display (LCD), for example. Through techniques known in the art, the display device 46 is designed to render digital data to a user. The input device 41 is designed to allow a user to select one of the data files 44 for viewing. Based on inputs from input device 41, the system controller 27 is designed to transmit data from a selected data file 44 to display device 46, which renders this data to the user. Therefore, the user can view the images defined by the data files 44 via the display device 46, when desired. The system controller 27 can also be designed to transmit the data produced by the conversion device 38 directly to the display device 46. Therefore, the user can use the display device 46 to position the system 15 instead of using the optical viewfinder 21 (FIG. 1), if desired.

A data interface 49 allows the system 15 to communicate data with external devices. When desired, the system controller 27 is configured to transmit data from the data files 44 so that external devices may receive and process the data defined by the files 44. For example, the data interface 49 may be coupled to a computer system (not shown), which renders the data to a user via a computer monitor (not shown). Alternatively, the data interface 49 may be coupled to a processing system (not shown) that processes the data defined by the data files 44 to develop pictures. In other embodiments, the data files 44 may be stored in an area of memory 29 that is detachable from the system 15. Therefore, the data files 44 may be removed from system 15 and interfaced with other systems (not shown) to create pictures or other types of images defined by the data files 44. Accordingly, the camera system 15 may be used to take pictures by forming images via lens 21, producing digital data defining the images formed by the lens 21, storing the digital data into data files 44, and rendering data from selected data files 44 to a user.

Figure 3:
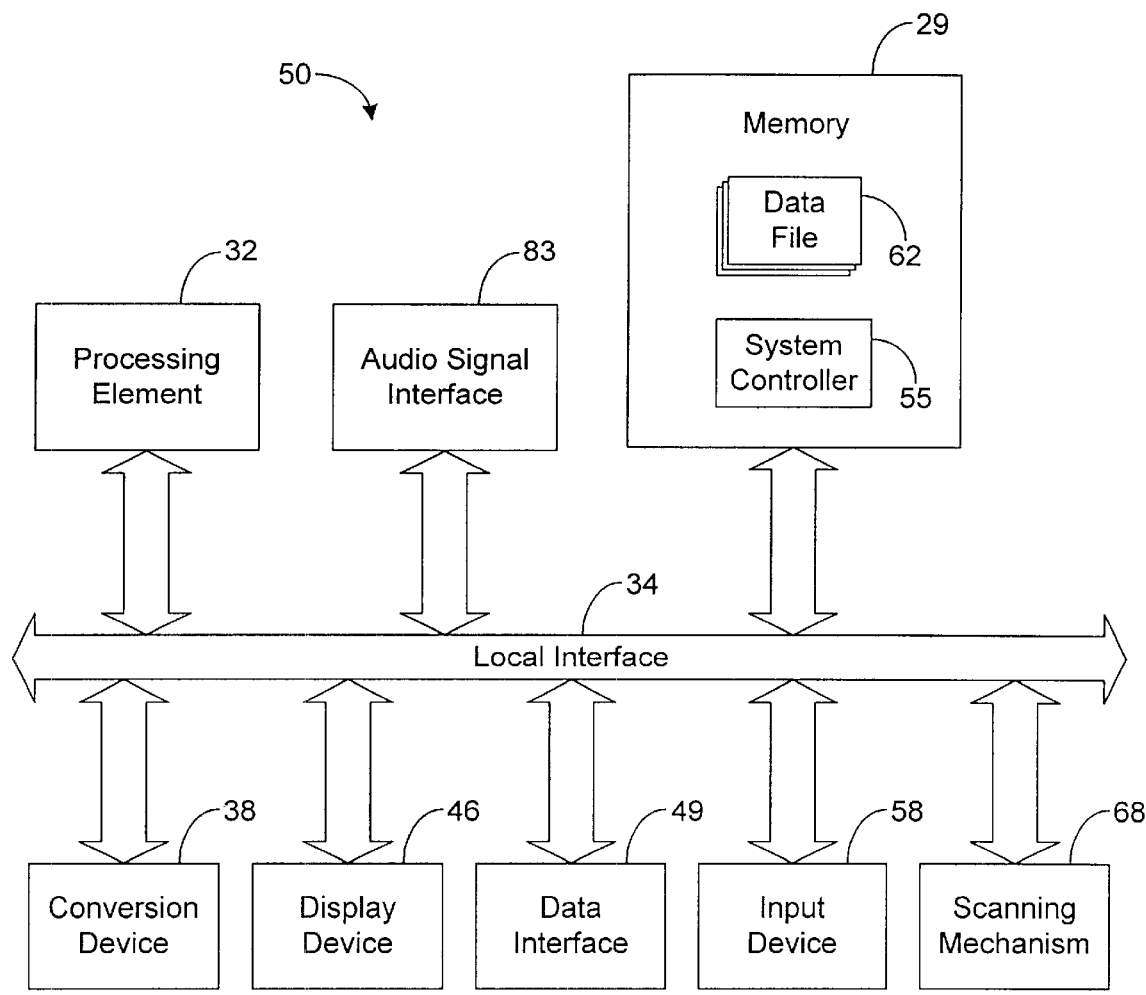
FIG. 3 is a block diagram illustrating a digital camera system in accordance with the preferred embodiment of the present invention.
Figure 4A:
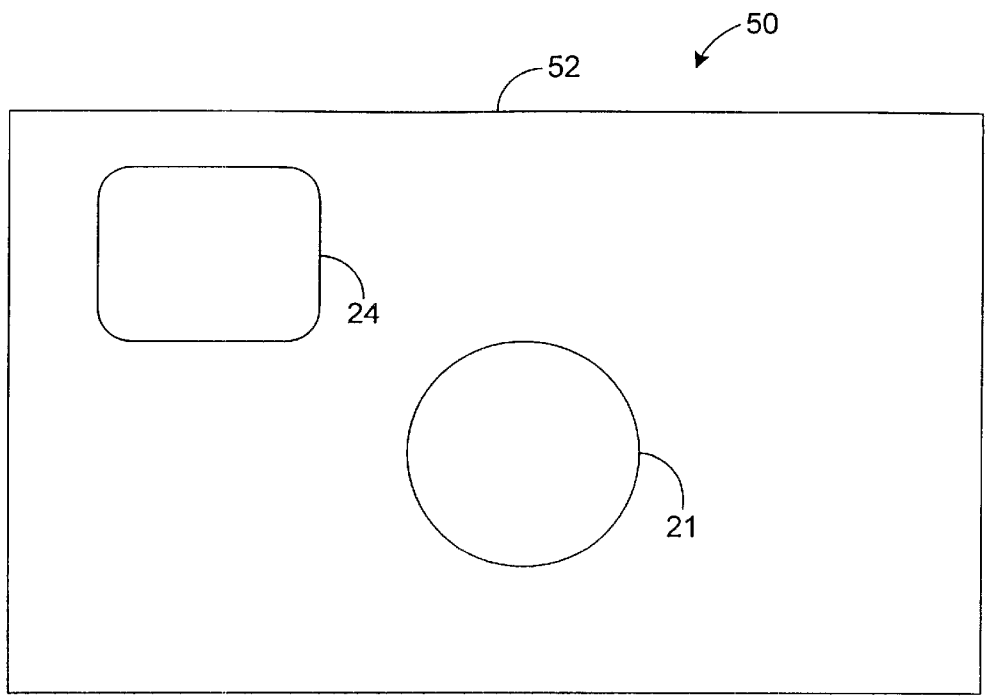
FIG. 4A is a schematic diagram illustrating a front view of the digital camera system of FIG. 3.

FIG. 3 depicts an implementation of a digital camera system 50 in accordance with the present invention. In the preferred embodiment, the system 50 is a portable, handheld device. Similar to system 15, system 50 of the present invention includes memory 29, a processing element 32, a local interface 34, a conversion device 38, a display device 46, and a data interface 49, which perform substantially the same functionality described for these devices hereinabove. The system 50 also includes a housing unit 52 to house and protect the aforementioned components of the system 50, as shown by FIG. 4A. Also shown by FIG. 4A, the system 50 includes a lens 21 and an optical viewfinder 24, similar to system 15 of the prior art.

Referring again to FIG. 3, the digital camera system 50 of the present invention also includes a system controller 55 to control the operation of the system 50. The system controller 55 can be implemented in software, hardware, or a combination thereof. In the preferred embodiment, as illustrated by way of example in FIG. 3, the system controller 55 of the present invention along with its associated methodology is implemented in software and stored in memory 29.

Note that the system controller 55, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the system controller 55 may be magnetically stored and transported on a conventional portable computer diskette.

As in system 15, the lens 21 forms an image from light received by the lens 21, and the conversion device 38 produces digital data defining this image. In response to inputs from input device 58, which can include buttons and/or switches, for example, the system controller 55 stores the digital data produced by the conversion device 38 into data files 62. For example, the input device 58 may include a button or switch that, when activated, transmits a signal to system controller 55 indicating that a picture should be taken. In response, the system controller 55 stores the set of digital data produced by conversion device 38 that defines the image currently formed by the lens 21. Therefore, the data files 62 may define images of scenes captured by the system 50, and the data defining the data files 62 may be rendered to a user via display device 46 or an external device (not shown), similar to the data within the data files 44 of system 15.

Unlike system 15, the system 50 includes a scanning mechanism 68, which is also housed by housing unit 52. The scanning mechanism 68 is configured to produce digital data that defines an image of a document. As used herein, the word "scan" shall be defined as moving a light-sensitive device across an image bearing surface, such as a document, converting the light and dark areas on the surface to binary digits that can be interpreted by a computer system. An example implementation of a suitable scanning mechanism 68 is fully described in U.S. Pat. No. 5,825,044, entitled "Freehand Image Scanning Device which Compensates for Non-Linear Color Movement" and filed on Feb. 25, 1997, by Allen et al., which is incorporated herein by reference. The scanning mechanism 68 is specifically designed to capture images of documents and to define these images in data such that a user can determine the text of the document when the data is rendered to the user.

Figure 4B:
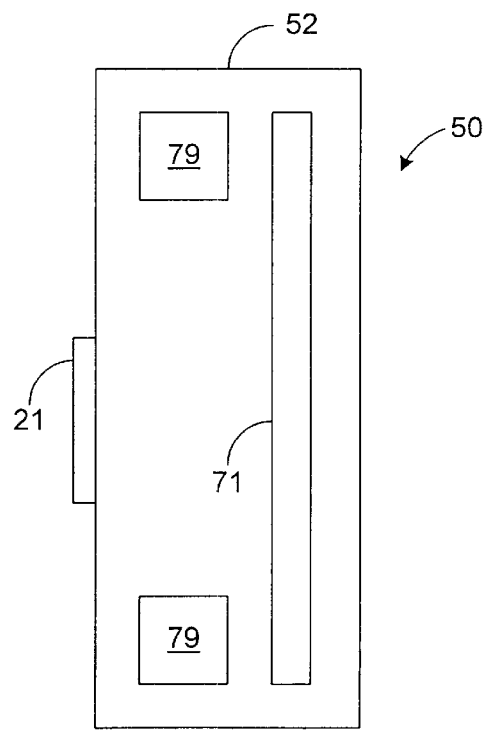
FIG. 4B is a schematic diagram illustrating a bottom view of the digital camera system of FIG. 4A.
Figure 5:
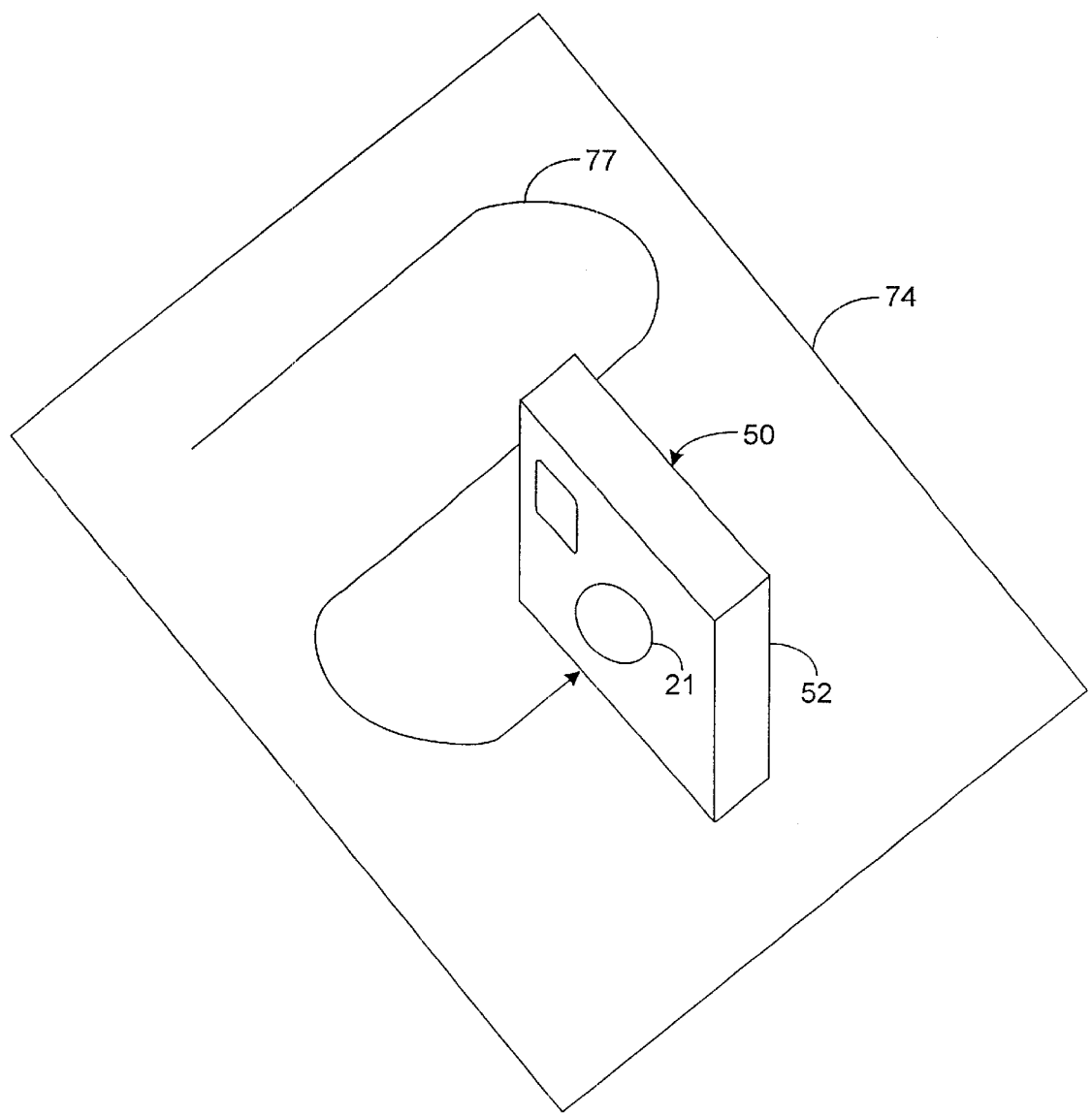
FIG. 5 is a schematic diagram illustrating the digital camera system of FIG. 3 as the system is passing over and scanning the surface of a document.

In the preferred embodiment, the scanning mechanism 68 includes at least one imaging sensor 71 which is preferably located on the bottom of housing 52 as depicted by FIG. 4B, although other locations for the imaging sensor 71 are possible. The system 50 is preferably swiped across the surface of a textual document 74 in a meandering path 77 while the imaging sensor 71 is in close proximity to or in contact with the document 74, as shown by FIG. 5. The imaging sensor 71 faces the document 74 and is designed to receive light reflected off of the document 74 while the system 50 (and, therefore, the imaging sensor 71) is being swiped across the surface of document 74.

Figure 6:
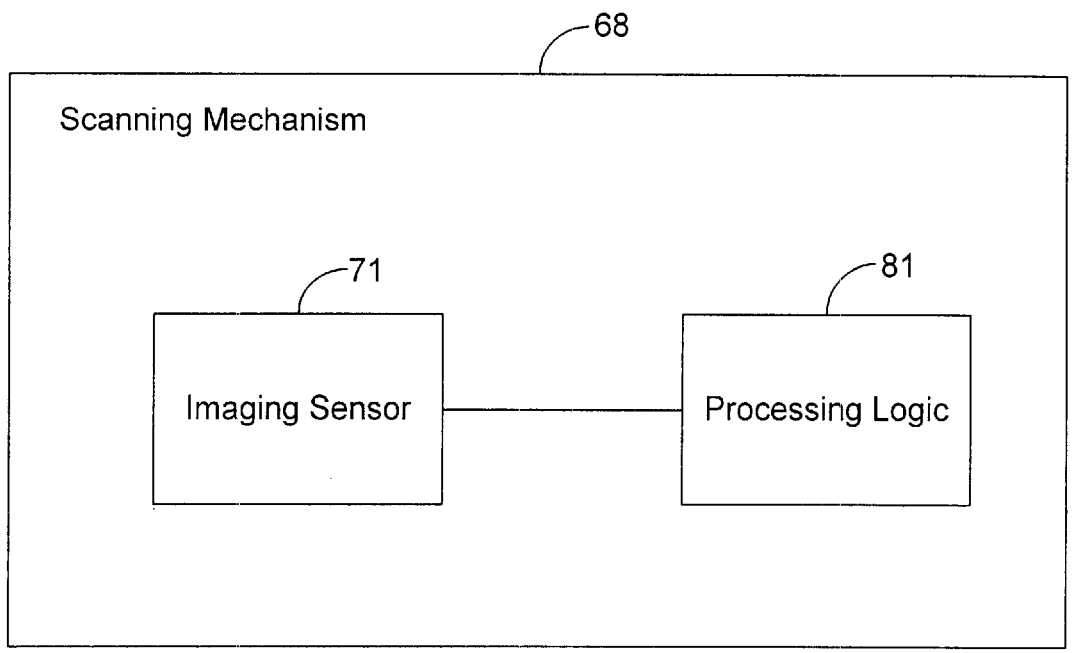
FIG. 6 is a block diagram illustrating the scanning mechanism of FIG. 3.

The imaging sensor 71 is configured to convert the light received by the sensor 71 into digital data as the system 50 is passing across the surface of the document 74. U.S. Pat. No. 5,686,720 entitled "Method and Device for Achieving High Contrast Surface Illumination," which is incorporated herein by reference, describes a method and device that may be used to illuminate and acquire data from the surface of the document 74. Furthermore, U.S. Pat. No. 5,769,384, entitled "Low Differential Light Level Photoreceptors," and U.S. Pat. No. 5,703,353, entitled "Offset Removal and Spatial Frequency Band Filtering Circuitry for Photoreceiver Signals," which are both incorporated herein by reference, describe methods for improving the accuracy of the data acquired by the scanning mechanism 68. As shown by FIG. 6, the scanning mechanism 68 preferably includes a processing device 81, which is configured to receive the digital data produced by sensor 71 and to define an image of the document 74 in data. This data is then stored in memory 29 by system controller 55 as a data file 62.

It may take one or more swaths (i.e., side-to-side passes across the document 74) to acquire the data pertaining to the desired text of the document. As an example, the meandering path 77 in FIG. 5 is shown as having two and a fraction swaths. The swaths should include regions of overlap, so that a stitching process may be used by processing device 81 to produce an accurate representation of the text of the document 74. At least one navigational sensor 79 may be included in the mechanism 68, as shown by FIG. 4B, to aid in the stitching process by tracking the system 50 (and, therefore, the imaging sensor 71) as the system 50 moves across the surface of the document 74. U.S. Pat. No. 5,729,008, entitled "Method and Device for Tracking Relative Movement by Correlating Signals from an Array of Photoelements," which is incorporated herein by reference, describes a suitable method and device for tracking the system 50 to aid in the stitching process.

Preferably, the scanning mechanism 68 performs a scan in response to an input from input device 58. For example, the input device 58 may include a button or switch that, when activated, transmits a signal to system controller 55 indicating that a document should be scanned. In response, the system controller 55 activates the scanning mechanism 68, and the scanning mechanism 68 defines a data file 62 as the system 50 is swiped over document 74.

The system 50 also includes an audio signal interface 83 in the preferred embodiment, although the audio signal interface 83 may be omitted in other embodiments. Through known techniques, the audio signal interface 83 is configured to receive audio signals and to convert the audio signals into digital data. Therefore, the audio signal interface 83 can be used to record a message. In this regard, the audio signal interface 83 receives an audio message and produces a set of digital data that defines the message in data. Then, the system controller 55 stores this set of digital data in memory 29 as a data file 62.

When desired, the message can be played for the user. For example, the audio signal interface 83 may include speakers, and the input device 58 may allow the user to select one of the data files 62 defining a message previously recorded by the audio signal interface 83. In response to the inputs from the user, the system controller 55 transmits the selected data file 62 to the audio signal interface 83, which utilizes the aforementioned speakers to produce audio signals so that the user can hear the message. An exemplary process for recording voice messages in portable scanning devices is described in U.S. Pat. No. 6,226,422, entitled "Voice Annotation of Scanned Images for Portable Scanning Applications" and filed on Feb. 19, 1998, which is incorporated herein by reference.

The system controller 55 is preferably configured to correlate selected data files 62. In this regard, multiple data files 62 may contain related information. For example, one of the data files 62 may include data produced by conversion device 38 that defines an image of an object. Another data file 62 may define an image scanned by scanning mechanism 68 from a document 74 that includes information pertaining to the aforementioned object. In addition, a third data file 62 may define an audio message regarding the aforementioned object. Therefore, it may be desirable for the foregoing files 62 to be correlated together so that the user can easily retrieve or select these data files 62.

Accordingly, the system controller 55 preferably allows the user to correlate any data file 62 with any other data file 62. For example, after defining a first data file 62 (via conversion device 38, scanning mechanism 68, or audio signal interface 83), the system controller 55 may allow the user via input device 58 to select another data file(s) 62 to be correlated with the first data file 62. In response, the system controller 55 correlates the first data file 62 with the selected data file(s) 62. As an example, the system controller 55 may define a pointer in the first data file 62 to point to the selected data file(s) 62 or vice versa. Other techniques for correlating the data files 62 may be employed without departing from the principles of the present invention.

As a result, the user may easily locate correlated data files 62. For example, memory 29 may include data files 62 that have been correlated together because they all relate to a particular object or topic. When the user wishes to view (in the case of image data), hear (in the case of audio data) or download any of these data files 62, the user may initially locate only one of the data files 62. Once the user locates one of the data files 62, the user can provide inputs via input device 58 to cause the system controller 55 to retrieve each of the data files 62 correlated with the located data file 62. Therefore, any of the other correlated data files 62 can be easily located or selected once one of these data files 62 has been located.

In addition to correlating selected data files 62, the system controller 55 is preferably configured to also combine data in multiple data files 62, if desired. Therefore, the data of multiple data files 62 can be merged together by the system controller 55 to create a new data file 62.

As an example, assume that a user attends a trade show and discovers a product of interest at the trade show. The user may take a picture of the product via lens 21. In other words, light reflecting off of the product is received by lens 21 and is converted to a set of digital data by conversion device 38. This set of digital data is then stored in memory 29 as a first data file 62. Then, the user may scan a data sheet associated with the product (e.g., a data sheet showing performance data relating to the product). In other words, the user passes the system 50 across the surface of the data sheet such that the imaging sensor 71 detects the desired text of the data sheet. The processing logic 81 forms digital data defining an image of the data sheet, and this digital data is stored in memory 29 as a second data file 62.

Figure 7:
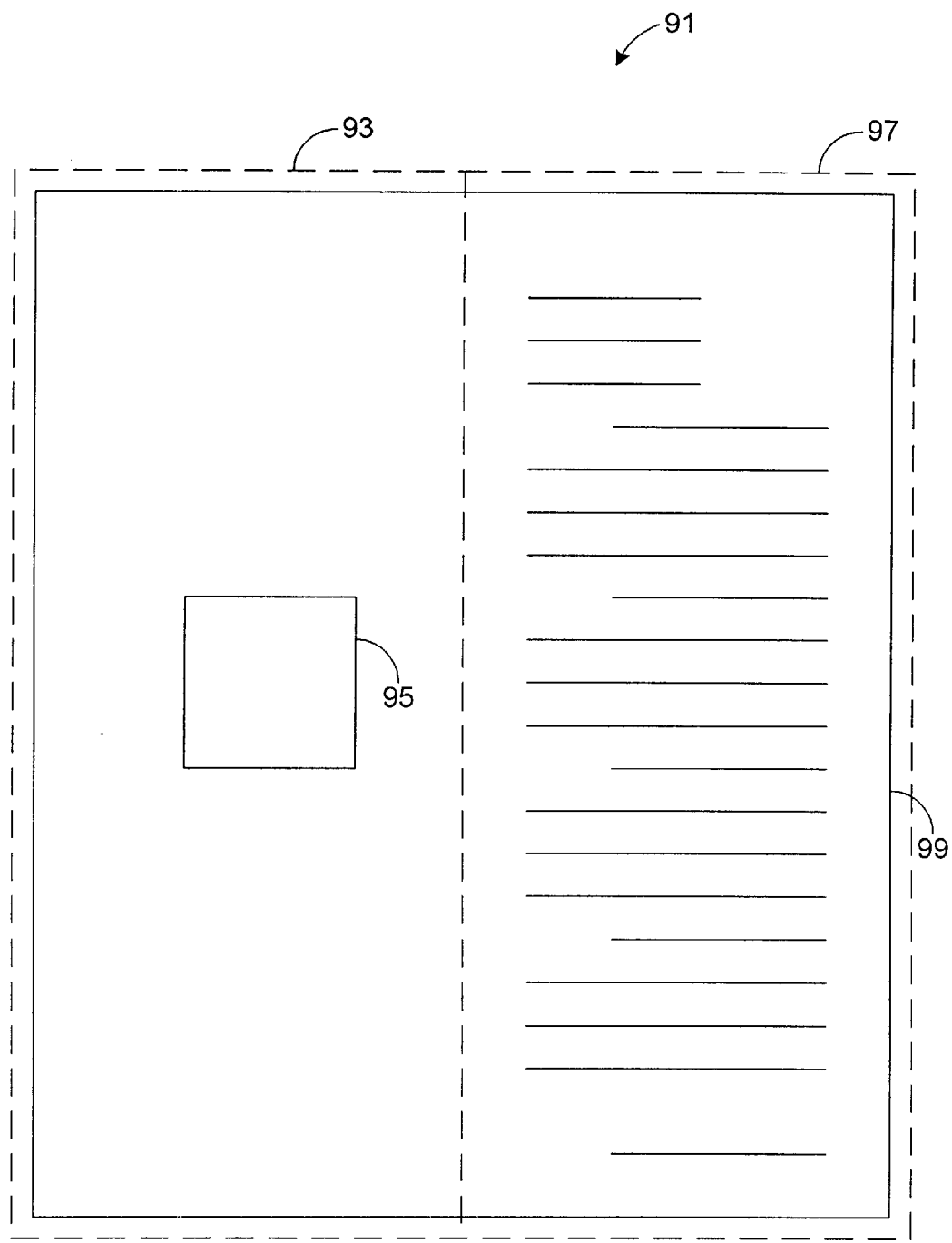
FIG. 7 is a schematic diagram illustrating an image produced from data merged together by the system controller of FIG. 3. A portion of the image depicts an object, and another portion of the image depicts a document associated with the object.

The first and second data files 62 may then be merged together into a new data file 62, if desired. For example, refer to FIG. 7, which depicts an exemplary image 91 defined by the new data file 62. As depicted by FIG. 7, the image 91 defined by the new data file 62 may have a portion 93 depicting the product 95 and may have another portion 97 depicting the data sheet 99 associated with the product 95. The portion 93 is defined by data merged into the new data file 62 from the first data file 62, and the portion 97 is defined by data merged into the new data file 62 from the second data file 62. The new data file 62 may be downloaded from the system 50, when desired, and processed according to conventional techniques.

Figure 8:
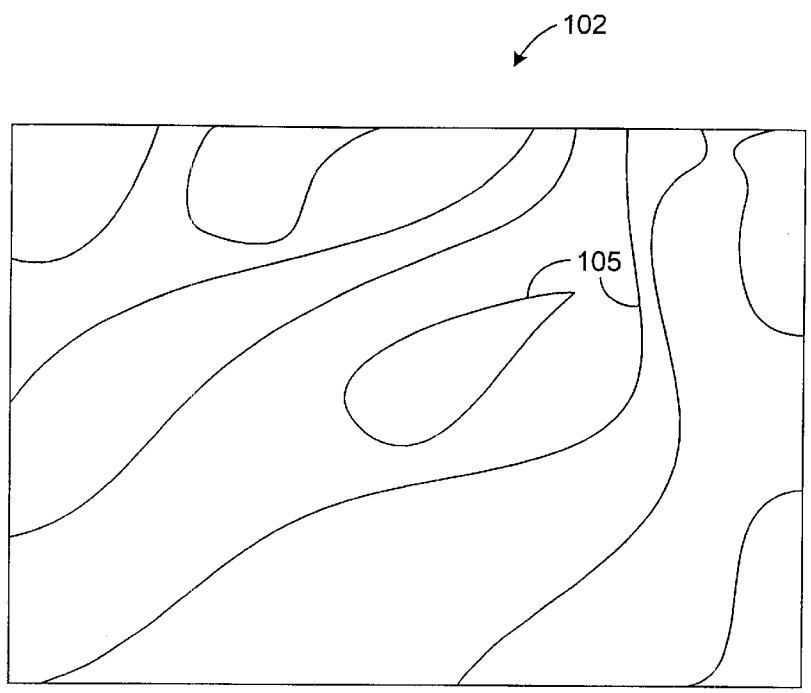
FIG. 8 is a schematic diagram illustrating a contour map of a geographical region.

In another application, the system 50 may be used to scan a topological map 102 (FIG. 8) of a geographical region via scanning mechanism 68. As depicted by FIG. 8, most topological maps 102 of geographical regions include contour lines 105 denoting regions of corresponding or similar altitude. The digital data defining the scanned image of the map 102 is stored in memory 29 as a first data file 62.

The user may also go to the geographical region and take a picture of the scenery at the geographical region corresponding with the map 102. Therefore, a second data file 62 is created by capturing light from the scenery of the geographical region via lens 21 and by converting this light into digital data that defines the second data file 62.

Figure 9:
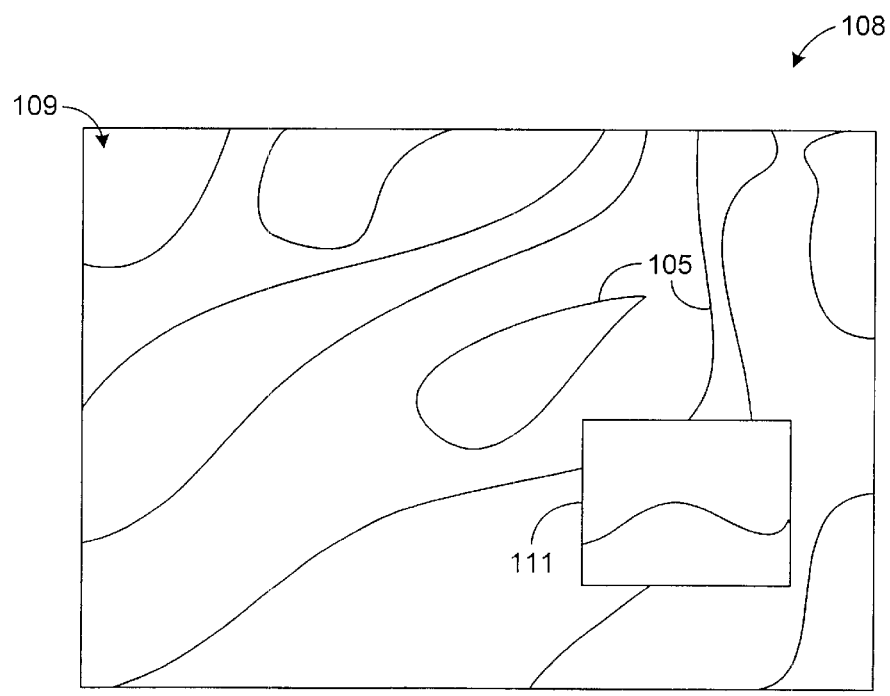
FIG. 9 is a schematic diagram illustrating an image produced from data merged together by the system controller of FIG. 3. A portion of the image depicts the display map of FIG. 8, and another portion of the image depicts scenery located at the geographical region associated with the display map.

If desired, the system controller 55 may then merge the first and second data files 62 into a new data file 62 to define an image depicting the map 102 and the scenery of the region defined by the map 102. This new data file 62 may then be rendered via display device 46 or may be downloaded and rendered by another display device (not shown). As an example, FIG. 9 depicts a combined image 108 defined by the new data file 62. As can be seen by referring to FIG. 9, the combined image 108 depicts an image 109 of the map 102 scanned into the digital camera system 50 and defined by the first data file 62. Furthermore, the combined image 108 also depicts an image 111 of the scenery defined by the second data file 62. Therefore, a user can simultaneously view the image 109 of the map 102 and the image 111 of the scenery of the geographical region associated with the map 102.

It should be noted that the feature of merging multiple data files 62 into a new data file 62 is not a necessary feature of the present invention. In this regard, the data files 62 may be downloaded from or rendered by the system 50 separately, if desired.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention.

Now therefore, the following is claimed:

1. A digital camera system, comprising:

a lens;

a conversion device configured to receive light from said lens and to define a first set of digital data based on said light;

a scanning mechanism configured to scan a document and to produce a second set of digital data, said second set of digital data defining an image of said document, said scanning mechanism comprising an imaging sensor and a processing device, said imaging sensor configured to receive light reflected from said document and to produce electrical signals, said processing device configured to receive said electrical signals from said imaging sensor and to define said second set of digital data based on said electrical signals from said imaging sensor;

a storage device; and a system controller configured to store said first set of digital data and said second set of digital data into said storage device.

2. The system of claim 1, a housing unit coupled to said lens, said housing unit housing said conversion device, said scanning mechanism, and said storage device.

3. The system of claim 1, further comprising an audio signal interface configured to receive audio signals and to define a third set of digital data based on said audio signals, wherein said system controller is further configured to correlate one of said sets of digital data with another one of said sets of digital data.

4. The system of claim 1, wherein said system controller is further configured to merge said first and second sets of digital data into a third set of digital data.

5. The system of claim 4, wherein said third set of data digital data defines an image based on data from said first set of digital data and from said second set of digital data.

6. The system of claim 4, wherein said first set of digital data defines an image of an object and said document includes information associated with said object.

7. A digital camera system, comprising:

a lens;

a conversion device configured to receive light from said lens and to define a first set of digital data based on said light;

a scanning mechanism configured to scan a document and to produce a second set of digital data, said second set of digital data defining an image of said document, wherein said document is a contour map of a geographical region and said first set of data defines an image of said geographical region;

a storage device; and a system controller configured to store said first set of digital data and said second set of digital data into said storage device wherein said system controller is further configured to merge said first and second sets of digital data into a third set of digital data.

8. The system of claim 7, wherein said third set of digital data defines said image of said geographical region and defines an image of said contour map.

9. A digital camera system, comprising:

a lens;

means for defining digital data based on light passing through said lens;

means for scanning a document;

means for defining a second set of digital data based on light received by said scanning means;

a storage device;

means for storing said first and second sets of digital data in said storage device; and means for merging said first set of digital data and said second set of digital data into a third set of digital data, wherein said first set of digital data defines an image of an object, said second set of digital data defines an image of said document, and said third set of digital data defines an image depicting at least a portion of said image of said object and depicting at least a portion of said image of said document.

10. The system of claim 9, further comprising a means for housing said scanning means, said housing means coupled to said lens.

11. The system of claim 9, further comprising a means for tracking a path of said system.

12. The system of claim 9, wherein said third set of digital data defines an image based on data from said first and second sets of digital data.

* * * * *